United States Patent [19]
Bonnet

[11] Patent Number: 5,890,584
[45] Date of Patent: Apr. 6, 1999

[54] DETACHABLE MATERIAL HANDLING TRAY WITH AUTOMATIC PARCEL EJECTION MECHANISM

[76] Inventor: Henri Bonnet, 290 Crosstree La., Atlanta, Ga. 30328

[21] Appl. No.: 786,246

[22] Filed: Jan. 22, 1997

[51] Int. Cl.$^6$ .............................. B65G 47/34; B65G 35/00
[52] U.S. Cl. ................................ 198/867.15; 198/867.14; 198/867.01; 198/370.02
[58] Field of Search .................... 198/867.01, 867.13, 198/867.14, 867.15, 370.03, 370.02

[56] References Cited

U.S. PATENT DOCUMENTS

| | | |
|---|---|---|
| 2,286,332 | 6/1942 | Bleyer . |
| 2,293,121 | 8/1942 | Dudley . |
| 2,884,118 | 4/1959 | Williams . |
| 2,938,621 | 5/1960 | Aasted ............................... 198/867.15 |
| 3,026,988 | 3/1962 | Fisk . |
| 3,202,266 | 8/1965 | Schmermund . |
| 3,262,549 | 7/1966 | Stewart et al. . |
| 3,262,550 | 7/1966 | Kampfer . |
| 3,348,678 | 10/1967 | Flowers . |
| 3,349,893 | 10/1967 | Jordan et al. . |
| 3,481,807 | 12/1969 | Kanamori . |
| 3,511,357 | 5/1970 | Vanderhoof . |
| 3,756,380 | 9/1973 | Ackroyd et al. . |
| 3,776,349 | 12/1973 | Kampfer . |
| 3,777,877 | 12/1973 | Piper . |
| 3,788,447 | 1/1974 | Stephanoff . |
| 3,904,028 | 9/1975 | Muller . |
| 3,976,192 | 8/1976 | Muller . |
| 4,078,654 | 3/1978 | Sarovich . |
| 4,084,687 | 4/1978 | Lapeyre . |
| 4,128,163 | 12/1978 | Rana et al. ........................ 198/370.02 |
| 4,170,281 | 10/1979 | Lapeyre . |
| 4,185,737 | 1/1980 | Blattermann . |
| 4,227,610 | 10/1980 | Gerdes et al. . |
| 4,295,559 | 10/1981 | Neal et al. . |
| 4,402,393 | 9/1983 | Kent .................................. 198/345.3 |

(List continued on next page.)

FOREIGN PATENT DOCUMENTS

| | | |
|---|---|---|
| 0 175 483 | 3/1986 | European Pat. Off. . |
| 1 316 628 | 4/1963 | France . |
| 2 462 367 | 2/1981 | France . |
| 352226 | 4/1922 | Germany . |
| 2-221007 | 9/1990 | Japan . |
| 3-95009 | 4/1991 | Japan . |
| 1316954 | 6/1987 | U.S.S.R. . |
| 1514708 | 10/1989 | U.S.S.R. . |
| 1 045 348 | 10/1966 | United Kingdom . |
| 1046164 | 10/1983 | United Kingdom ............... 198/867.14 |
| 1049372 | 10/1983 | United Kingdom ............... 198/867.14 |
| 2175560 | 12/1986 | United Kingdom ............... 198/867.13 |
| 1514708 | 10/1989 | United Kingdom . |

Primary Examiner—Karen M. Young
Assistant Examiner—Steven B. McAllister
Attorney, Agent, or Firm—Jones & Askew, LLP

[57] ABSTRACT

A conveyor system is provided including a platform for attachment to a conveyor which may be utilized for transporting items of various sizes and weights to designated output destinations along the conveyor. The platforms may be used for the transporting of objects only or may include a variety of conveyor equipment such as baskets, parts bins or parcel ejection mechanisms. The system utilizes a plurality of hinged conveyor trays which are connected to an underlying conveyor via a plurality of flexible edge retainer members that secure the edges of the platforms to the underlying conveyor surface and isolate adjacent platforms from each other. The platforms are secured in place by a medially located center locking mechanism. The system may utilize a conventional belt conveyor onto which the platforms are connected. Ejection mechanisms may be built in or attached to the platforms for diverting objects from the upper surface of the platforms to desired locations. A programmable controller may be provided to control the material handling system and the discharge of items from the surface of platforms by the ejection mechanisms. The system may be easily repaired by removing individual platforms from the underlying conveyor quickly and without tools. The system may be operated at high speeds and at reduced noise levels.

32 Claims, 7 Drawing Sheets

U.S. PATENT DOCUMENTS

| | | |
|---|---|---|
| 4,537,658 | 8/1985 | Albert . |
| 4,582,193 | 4/1986 | Larsson ............................. 198/867.15 |
| 4,682,686 | 7/1987 | Ueda et al. . |
| 4,712,965 | 12/1987 | Canziani . |
| 4,732,260 | 3/1988 | Canziani . |
| 4,776,454 | 10/1988 | Momose ................................ 198/853 |
| 4,875,573 | 10/1989 | Wiseman . |
| 4,896,760 | 1/1990 | Triantafilou et al. .............. 198/370.02 |
| 5,127,510 | 7/1992 | Cotter et al. . |
| 5,176,247 | 1/1993 | Counter et al. . |
| 5,388,681 | 2/1995 | Bonnet .................................... 198/365 |
| 5,421,446 | 6/1995 | Koch et al. . |
| 5,433,311 | 7/1995 | Bonnet . |
| 5,456,349 | 10/1995 | Axmann . |

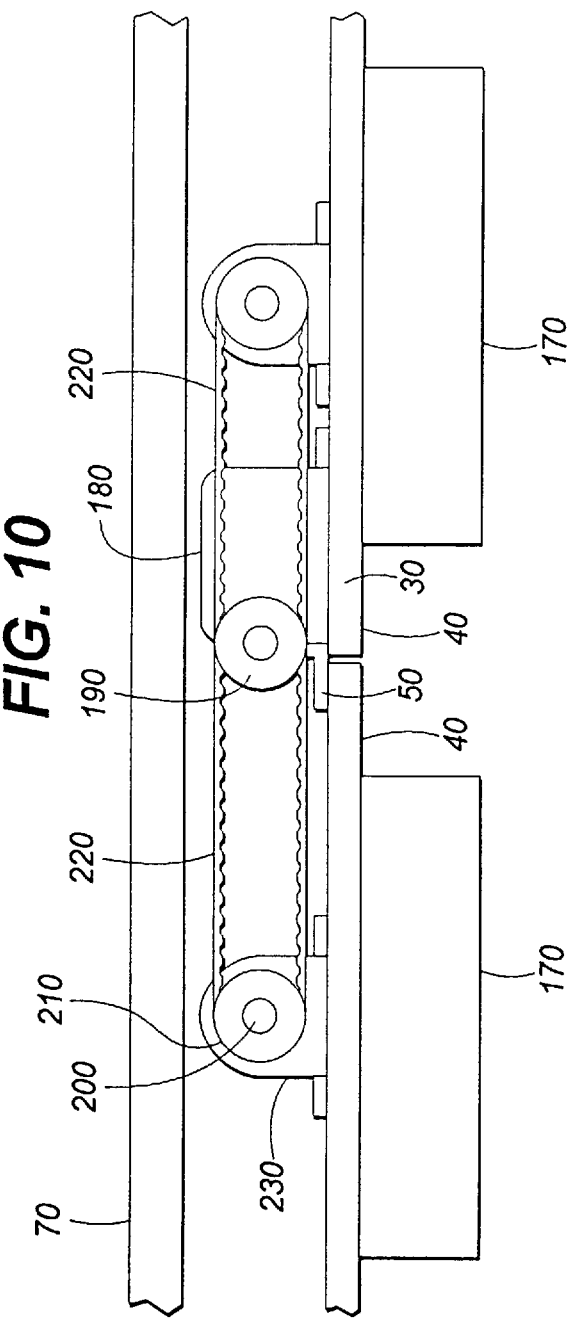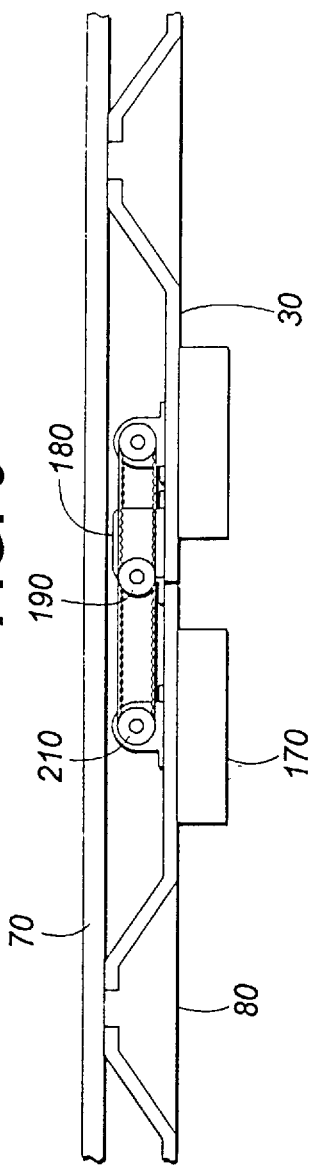

DETACHABLE MATERIAL HANDLING TRAY WITH AUTOMATIC PARCEL EJECTION MECHANISM

FIELD OF THE INVENTION

This invention relates in general to transfer and sorting of items such as packages to a variety of output destinations, and more particularly relates to a material handling conveyor system utilizing removable platforms which may be used to support and carry objects such as parcels and may be used to support and carry a variety of material handling equipment such as a parcel ejection mechanism for discharging parcels from the surface of the platform onto designated output shoots, bins, or subsequent conveyors under programmed control.

BACKGROUND OF THE INVENTION

Modern material handling systems are called upon to transfer and sort a high volume of objects such as packages, equipment, luggage, etc. Such material handling systems often include conveyor systems adapted to include various material handling equipment such as baskets, trays, and a variety of diverting systems for diverting packages from the supporting surfaces of the conveying systems to a variety of output destinations.

Typically, material handling equipment such as baskets, parts bins, and material diverting systems are placed on a moving conveyor or are permanently fixed to a conveyor. In the case of material diverting systems, a typical package diverting system utilizes a pushing element mounted on a conveying surface which when actuated ejects a package or object laterally across the conveying surface to a desired discharge station. Often such systems are relatively permanently mounted adjacent to the conveying surface or are relatively permanently mounted on the conveying surface. Such methods of placing material handling equipment on a moving conveying surface can be noisy, and incapable of sustained movement at relatively high speeds. Additionally, where a package diverting system is mounted adjacent to or on the moving conveying surface, down time resulting from breakdown and subsequent repair, is increased by the requirement of bringing the conveying system to a stop during the period of repair of the individual material handling component.

In U.S. Pat. No. 2,286,332 to Dyer, a modular chain link attachment for traveling water screens is disclosed for use on the links of a sprocket-driven chain. Individual traveling water screen panels are adapted to be attached between the links of an underlying conveying chain. A flange is formed on the water screen panel which is notched at the end to correspond with the pins between the links of the underlying conveying chain. On the side of the flange, a stirrup is disposed medially of the length of the chain link and is adapted to being engaged by a pin extending through the side bars of the underlying chain link to secure the detachable panel to the chain link.

U.S. Pat. No. 4,078,654 to Sarovich describes a conveyor structure in which conveyor units are attached to and moved by flexible coated wire cables. A plurality of article-supporting conveyor flats or sections are arranged along the flexible coated wire cable. The individual conveyor flats are attached to the flexible coated wire cable of the mating of a flexible metal latching arm to a corresponding rectangular-shaped flat-attaching and supporting plate. The rectangular-shaped flat-attaching and supporting plate is, in turn, attached to the underlying flexible coated wire cable. The individual conveyor unit may be detached and removed from the supporting plate members by pressing inwardly on the flexible resilient latching arms from below the flat-attaching and supporting members and then manually lifting the conveyor unit off the flat-attaching and supporting member.

In those systems, modular conveying surfaces are attached and driven by underlying conveying units such as the sprocket-driven chain of Blyer and the wire cable of Sarovich. In those systems, in order to remove the conveying surface from the underlying conveying unit, adjacent conveying surfaces or platforms must be disturbed. Additionally, during movement of the conveying system in those systems, action of the components of the conveying platform with the underlying conveying unit, is a source of wear and noise and necessarily limits the speed at which the conveying system may be operated. Additionally, the need to disturb adjacent conveying surfaces and the need to use tools for the removal of conveying surfaces in those systems results in increased downtime of the conveying system.

As may be seen from the foregoing, prior conveying and material handling systems are complex and appear to require the use of tools and significant downtime for maintenance and removal of individual conveying platforms. Therefore, there is a need in the art for a material handling system that is simple in construction, which can be easily maintained by removal and replacement of modular platforms without the use of tools, and which can convey objects at varying speeds and at relatively low noise levels. There is also a need in the art for a modular platform which is capable of carrying a variety of material handling equipment such as a parcel ejection mechanisms. Upon failure of the parcel ejection mechanism or at required maintenance intervals, the individual modular platform containing the parcel ejection mechanism may be quickly removed without the use of tools resulting in greatly decreased downtime.

BRIEF DESCRIPTION OF THE DRAWINGS

FIG. 9 is a side elevation view of the platform of FIG. 4 containing a pair of parcel ejection mechanisms.

FIG. 10 is a side elevation view of a pair of parcel ejection mechanisms attached to an underlying platform.

SUMMARY OF THE INVENTION

The present invention overcomes deficiencies in the prior art by providing a material handling system that is simple in construction, which can be easily maintained by removal and replacement of modular platforms without the use of tools, and which can convey objects at varying speeds and at relatively low noise levels. The present invention also provides a modular platform which is capable of carrying a variety of material handling equipment such as a parcel ejection mechanisms.

DETAILED DESCRIPTION OF THE PREFERRED EMBODIMENT

Figure 1:
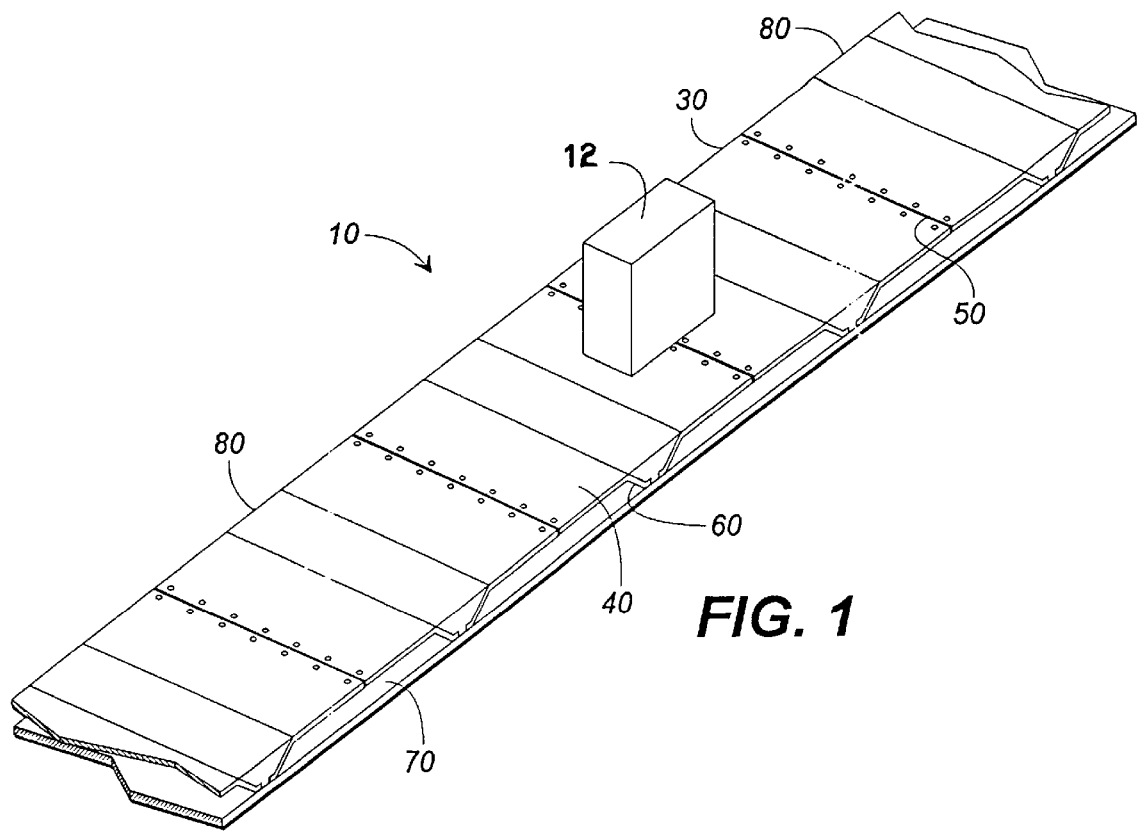
FIG. 1 is a pictorial view of an automated material handling system embodying the present invention generally referenced as a conveyor 10.
Figure 7:
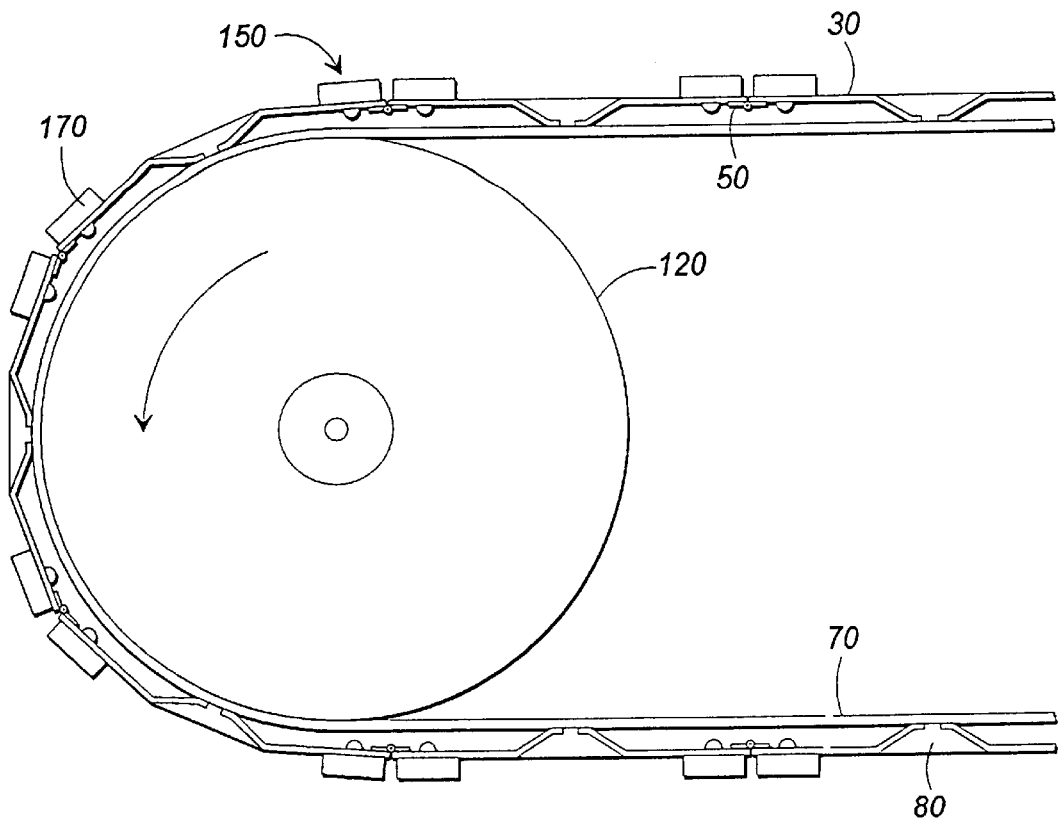
FIG. 7 is a side diagrammatic view of the material handling system of FIG. 1 containing a plurality of parcel ejection mechanisms and disposed about a drive drum.

Referring now in more detail to the drawings, in which like numerals refer to like parts throughout the several drawings, FIG. 1 shows a material handling system or conveyor 10 that includes a substantially smooth surface conveyor comprised of a plurality of platforms or platforms 30 connected to an underlying conveyor base structure such as a conveyor belt 70. In the preferred form shown, the platforms 30 are connected to the underlying conveyor belt 70 by the insertion of the edges leading and trailing 60 of the platforms 30 beneath a pair of flexible platform edge retaining members 80 which form co-facing slots to accept the edges 60 of the platforms 30. As shown in FIG. 7, in the preferred form, the conveyor 10 forms a closed loop and may be driven by a drive drum 120, to be described in detail below. As shown in FIGS. 7–10, each platform 30 may include a pair of ejection mechanisms 150 to eject items such as parcels off conveyor to 10 a variety of output destinations such as a receiving chute, a parallel conveyor, or a nonparallel conveyor. Such parcels 12 shown in FIG. 1, may be loaded onto conveyor 10 manually or by an induction conveyor (not shown). The ejection mechanisms 150 discharge the parcel 40 to a desired destination in a manner to be described in detail below.

Figure 2:
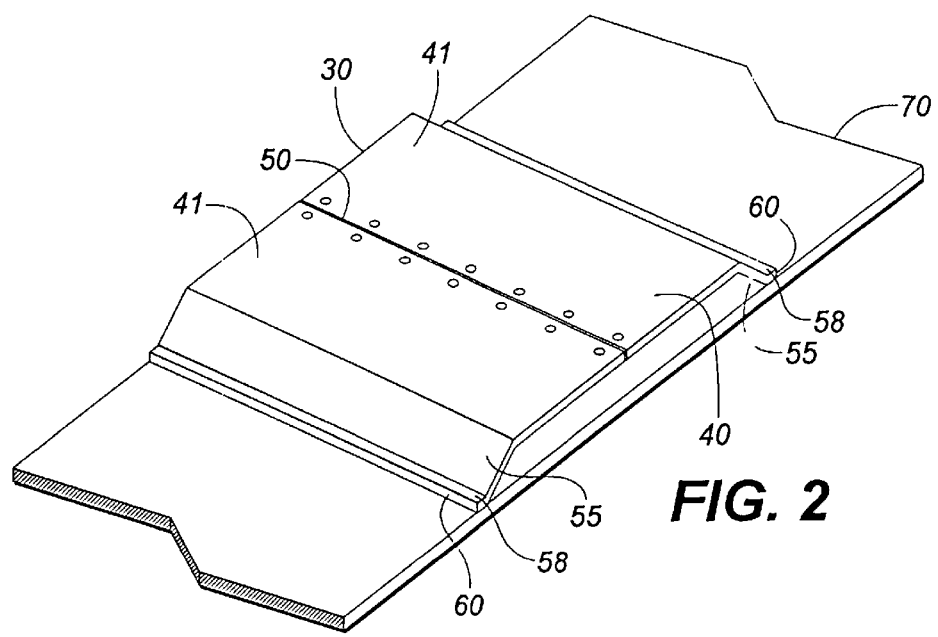
FIG. 2 is a pictorial view of a platform disposed on the upper surface of a conveyor belt except that the retaining members are not shown.
Figure 3:
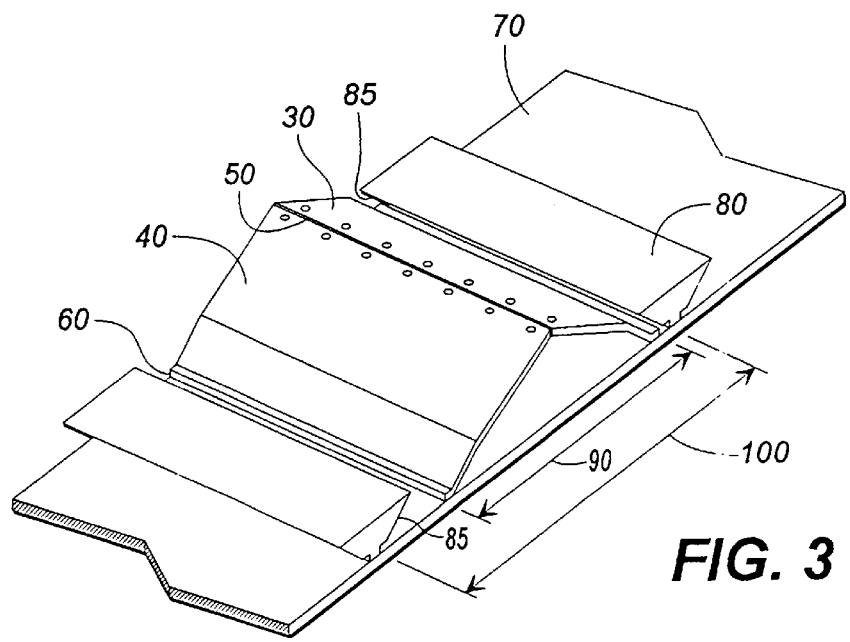
FIG. 3 is a pictorial view of a hinged material handing tray positioned for attachment to an underlying conveyor belt.

The conveyor 10 may be operated under the control of the digital controller, which may be a programmable logic controller (PLC) or a general purpose microprocessor which is found in a personal computer. Methods for programming such controllers to operate a material handling system of the type disclosed herein are conventional and known to those skilled in the art. Other sub-assemblies of the conveyor 10 include a hinged construction of the platform 30, as shown in FIGS. 1–3, which allows the platform 30 to be quickly and easily attached and detached to and from the underlying conveyor belt 70. The assemblies and sub-assemblies thus far noted and shown will now be described in detail.

Figure 4:
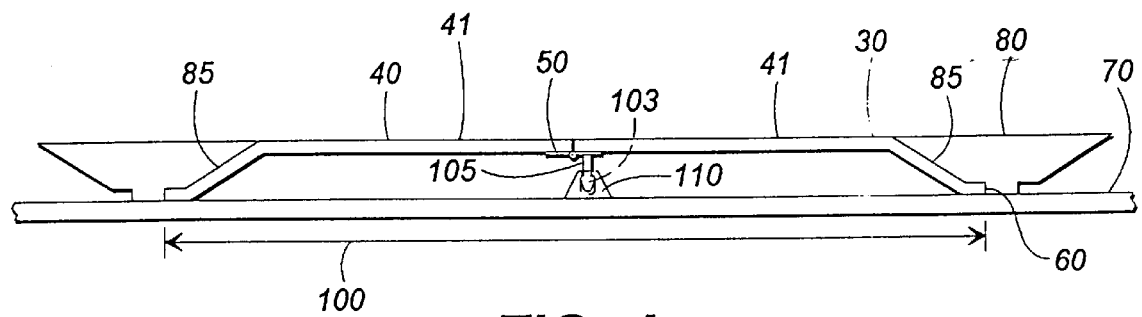
FIG. 4 is a pictorial view is a side elevation view of a platform attached to the surface of the conveyor belt by a pair of flexible edge retainer members and by a center locking pin.
Figure 5:
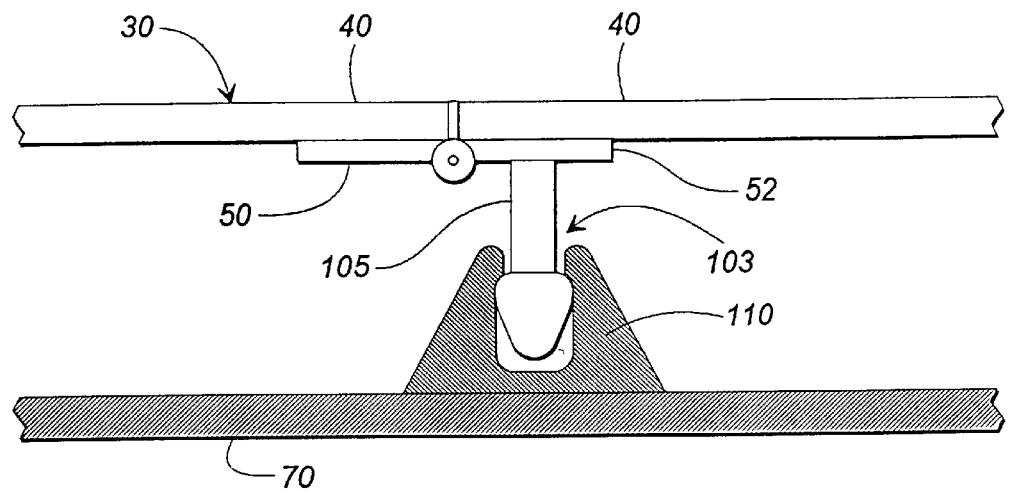
FIG. 5 is a side elevation view of a center locking pin and center locking pin receptor for attachment of a platform to an underlying conveyor belt.

Referring now to FIGS. 2 and 3, the conveyor 10 is comprised of a plurality of platforms 30 removably attached adjacent to the upper surface of a conveyor belt 70. In the preferred form shown, the platforms 30 are formed from extruded aluminum. It is understood that platforms 30 may be formed primarily from other suitable materials such as plastic, steel or wood. As shown in FIG. 2, the platform 30 is comprised of two panels 40 connected by an elongate hinge 50. As shown in FIGS. 4 and 5, the elongate hinge 50 is mounted to the first and second panels 40 on the underside of the panels 40. The hinge 50 may be a piano type hinge or other suitable hinge which allows the upper surface of the panels 40 to form the smooth surface of the platform 30. As is well known to those skilled in the art, the hinge 50 may be mounted to the panels 40 by rivets or by countersunk screws to provide a smooth upper surface of platform 30.

As shown in FIG. 2, the panels 40 terminate at edges 60 opposite the hinge 50. Prior to the edge 60 of the panels 40, the panels 40 form legs 55 terminating at bases 58. Thus, as shown in FIG. 2, when a platform 30 is disposed onto the upper surface of a conveyor belt 70, the legs 55 and bases 58 of its panels 40 maintain the two upwardly-directed package supporting surfaces 41 of the platform 30 in a spaced apart relation with the underlying conveyor belt 70.

As will be understood by viewing FIGS, 1, 3 and 4, the conveyor 10 is formed by the insertion of the edges 60 of a plurality of platforms 30 into a plurality of co-facing slots formed by a plurality of flexible edge retainer members 80. As shown in FIGS. 3 and 4, the flexible edge retainer members 80 are elongate members which run substantially the width of the conveyor belt 70. As is well known to those skilled in the art, the flexible edge retainer members 80 may be connected to the underlying conveyor belt by use of adhesives, cement, screws, or a variety of suitable attachment means.

As shown in FIG. 3, the platform 30 is attached to the conveyor belt 70 by flexing the panels 40 of the platform 30 about an axis formed by the hinge 50. As shown in FIG. 3, in the flexed configuration, the length 90 between the leading and trailing edges 60 of the platform 30 is less than the distance between the co-facing slots formed by the edge retainer members 80. As shown in FIG. 4, when the platform 30 is placed into its installed position on the upper surface of the conveyor belt 70, the length of the platform 30 assumes a length approximate to the distance 100 between the flexible edge retainer members 80. As shown in FIGS. 1 and 4, the top surface of the flexible edge retainer members 80 is substantially coplanar with the two upwardly-directed package supporting surfaces 41 of the platform 30 to provide a smooth transitional surface between adjacent platform 30.

Referring now to FIGS. 4 and 5, a center locking mechanism 103 is provided to secure each platform 30 into position with the edges 60 of the platform panels 40 engaging the co-facing slots formed by the flexible edge retainer members 80. The center locking mechanisms 103 are preferably made from a suitable flexible material such as rubber or plastic to provide isolation of the platforms 30 from the underlying conveyor belt 70. Such isolation serves to dampen vibration and noise and reduce wear.

Figure 6:
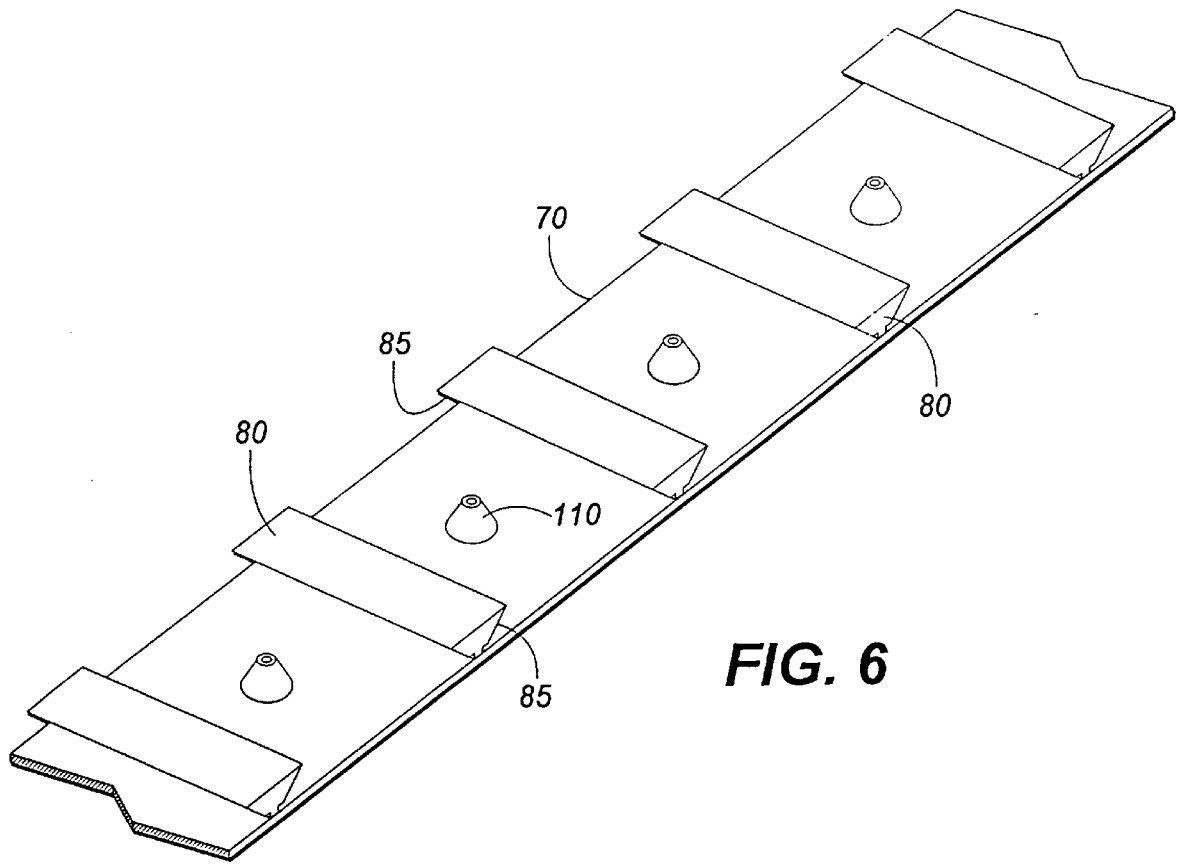
FIG. 6 is a pictorial view of a conveyor belt with attached flexible edge retainers and center locking pin receptors of FIGS. 4 and 5.

As shown in FIG. 5, the center locking mechanism 103 is comprised of a center locking pin 105 connected to one of the mounting brackets 52 of the hinge 50 adjacent to the hinge 50. As shown in FIGS. 5 and 6, the center locking pin 105 is adapted for engagement with a center locking pin receptor 110 which is attached to the underlying conveyor belt 70. By placing the center locking mechanism 103 slightly off-center of the hinge 50 as shown in FIGS. 4 and 5, bending of the panels 40 about the axis formed by the hinge 50 is not obstructed as the closed loop conveyor 10 travels about a supporting drive drum as shown in FIG. 7.

As shown in FIG. 7, as the conveyor 10 travels about a supporting drive drum 120, the individual platforms 30 flex about the hinge 50. It is understood that the closed loop conveyor system may be supported and driven by sprockets or other suitable drive mechanisms.

As is well known to those skilled in the art, the conveyor system 10 may be used to transport a variety of objects such as parcels or packages 12 shown in FIG. 1. In addition, as is readily understood to those skilled in the art, the individual platforms 30 may be adapted to carry a variety of pieces of material handling equipment (not shown) such as baskets, bins, parts containers and material diverting systems. From the foregoing description, it should be readily understood that the modular construction of the conveyor 10 allows for the easy removal and replacement of individual platforms 30 for maintenance or to exchange a given platforms 30 with a platforms 30 containing one of a variety of material handling equipment as discussed above.

As will be understood by viewing FIGS. 3, 4 and 5, a given platform 30 may be removed from the underlying conveyor belt 70 by lifting the platform 30 at or near the hinge 50 to disengage the center locking mechanism 103 and to disengage the edges 60 from the co-facing slots 85 formed by the flexible edge retaining members 80. Additionally, as can be seen from the foregoing description and as should be readily understood, the conveyor system 10 can be operated quietly at relatively high rates of speed due to the isolation of adjacent platforms 30 from each other by the flexible edge retainer members 80.

In a preferred embodiment of the present invention, one or each panel 40 of the platforms 30 may include a built-in mechanism for ejecting parcels from the surface of the platforms 30. As previously described, as shown in FIG. 8, parcel ejection mechanisms 150 may be used to discharge items such as parcels 12 from the surface of the conveyor system 10 to a variety of output destinations.

Figure 8:
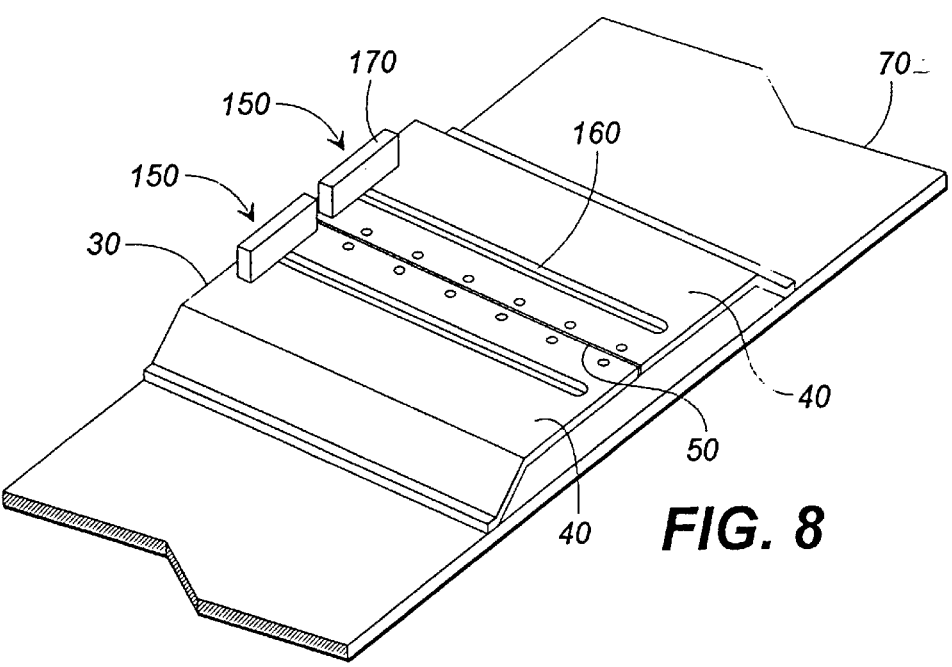
FIG. 8 is a pictorial view of the platform of FIG. 2 containing a pair of parcel ejection mechanisms.

As shown in FIG. 8, one form of the preferred embodiment provides for parcel ejection mechanisms 150 built into each of the panels 40 of the platforms 30. As shown in FIG. 8, to accommodate for the parcel ejection mechanisms 150, each panel 40 of the platforms 30 includes an elongate slot 160 for receiving a pusher number 170. Referring now to FIGS. 8, 9 and 10, the pusher member 170 is generally T-shaped and is disposed on the surface of the panels 40 of the platforms 30 so that the lower stem of the T-shaped pusher member 170 is inserted into the elongate slot 160 so that the pusher member 170 may slidably move across the width of the platforms 30 transverse to the direction of travel of the conveyor 10.

As shown in FIG. 10, the lower stem 230 of the pusher member 170 extends down through the elongate slot 160 beneath the lower surface of the platforms panels 40. A threaded opening (not shown) is provided in the lower stem 230 of each pusher member 170 for receiving a screw actuator 200. The screw actuator 200 is driven by an electric motor 180 which drives screw actuator 200 via cog belt 220 and cog belt pulley 210 which is operatively attached to the screw actuator 200. As shown in FIG. 10, one electric motor 180 may be utilized to power two pusher members 170, one attached to each of the panels 40 of the platforms 30. It should be understood that each of the pusher members 170 may be powered by separate electric motors 180 if it is desired to operate the pusher members 170 separately. Such a configuration may be useful to rotate a larger package by actuating each pusher member 170 separately.

Figure 11:
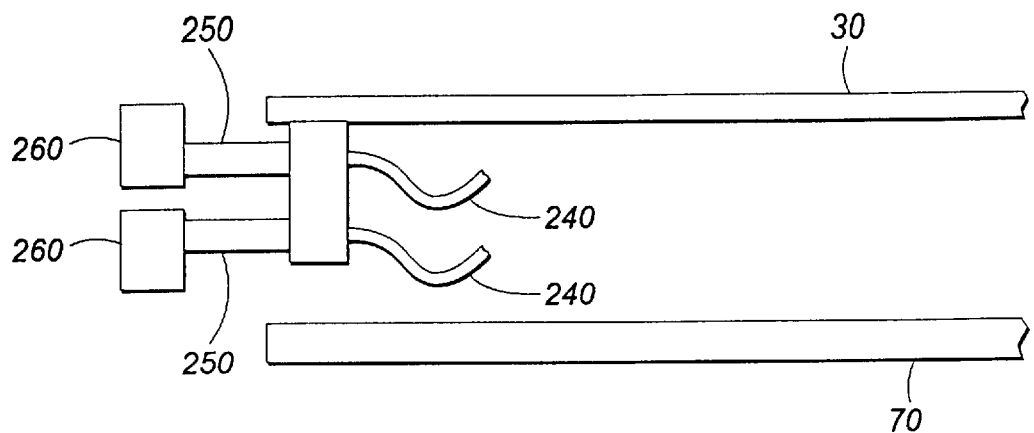
FIG. 11 is an end diagrammatic view of a pair of traveling electrical contacts in contact with a pair of stationary electrical power bars.

As shown in FIG. 11, a pair of electrical contacts 250 are attached relative to the platforms 30 and are electrically linked attached to the electric motor 180 via electric leads 240. The electrical contacts 250 extend outwardly from and travel with the platforms. Fixed, stationary, power strips 260 are positioned off the conveyor system 10 and adjacent to desired discharge locations. The electrical contacts 250 can be spring loaded (not shown) to provide continuous and even contact between the electrical contacts 250 and the fixed power strips 260. Thus, when it is desired that a parcel positioned adjacent to the pusher member 170 on the platform 30 be discharged to a desired discharge location, the electrical motor 180 will be energized by contact between the electrical contact 250 and the fixed power strips 260 when the parcel moves into a position adjacent to the desired discharge location. Energization of the electrical contacts 250 via the fixed power strips 260 energizes the electric motor 180 which in turn rotates the screw actuator 200 of the pusher members 170 to drive the pusher members 170 across the platform 30 at a high rate of speed and thereby discharge the parcel to the desired discharge location.

As described above, the pusher members 170 of the panels 40 of the platforms 30 may be actuated simultaneously to eject a parcel from the surface of platform 30. Alternatively, a pusher member 170 may be powered by separate electric motors 180 in order to actuate the pusher members 170 at different times and at varying speeds to facilitate the rotation or positioning of a parcel along the surface of the platform 30.

As described above, the parcel ejection mechanism 150 is driven independently of the underlying conveying system by the energization of the electric motors 180 via electrical power contact 250 and fixed power bars 260. Accordingly, a programmable logic controller at the parcel ejection mechanism 150 can be used to eject items at varying speeds as may be desired. As is well known to those skilled in the art, the PLC may vary the speed of the electric motor 180 by positively or negatively ramping the electric current across the motor. The programmable logic controller may direct the pusher member 170 to return to the starting position or likewise to eject parcels to the opposite side of the platforms 30 by reversing the polarity of the current supplied to the electric motor 180.

Figure 12:
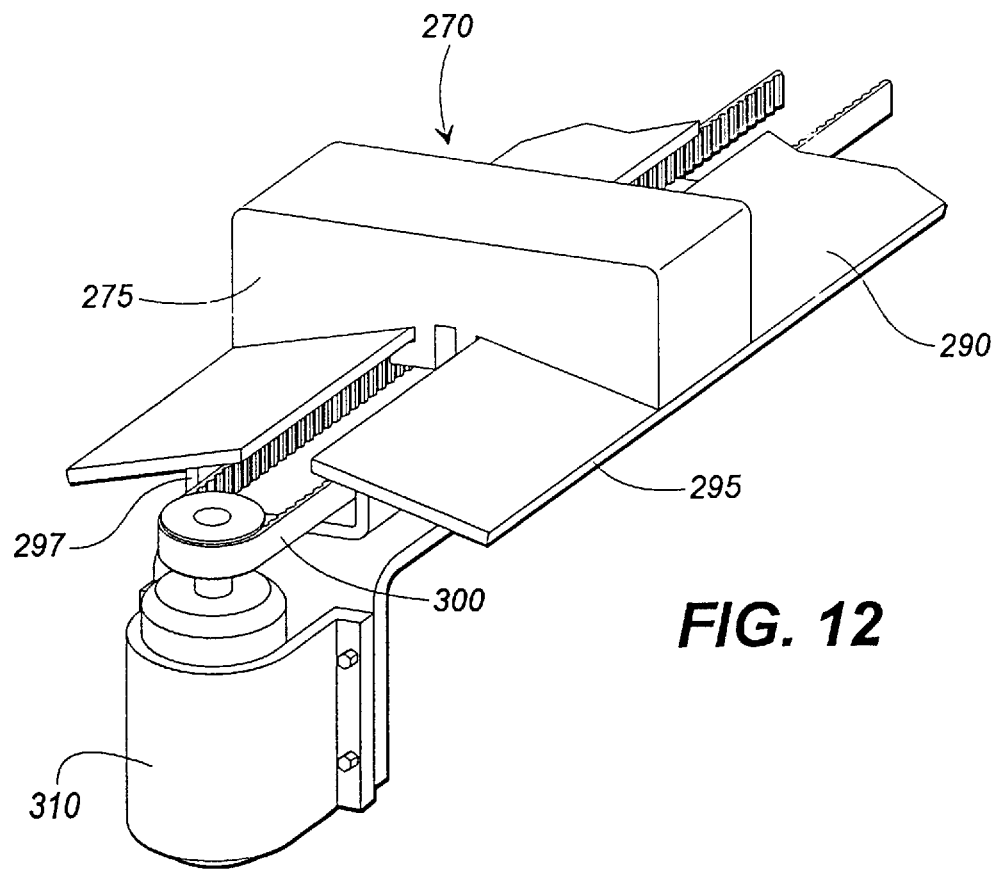
FIG. 12 is a pictorial view of an alternate "surface mount" ejection mechanism embodying the present invention.

An alternate form of a parcel ejection mechanism is shown in FIGS. 12–15. A parcel ejection mechanism 270 shown in FIG. 12 may be mounted on the upper surface of the panels 40 of the platform 30. This configuration provides for the ejection mechanism actuation equipment, to be described below, to be maintained above the surface of the platform 30. As shown in FIG. 12, the ejection mechanism 270 includes a generally T-shaped pusher member 275, also shown in FIG. 15, and an ejection mechanism housing 290, shown in FIG. 13, an electric drive motor 310 and a cog belt 300. As shown in FIGS. 12–15, the pusher member 275 slidably moves across the ejector mechanism housing 290 to eject an object positioned on the surface of the conveyor system 10 and adjacent to the pusher member 275.

Figure 13:
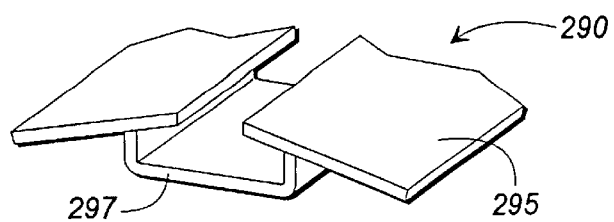
FIG. 13 is a cut-away pictorial view of a parcel ejection mechanism housing for containment of the alternate parcel ejection mechanism of FIG. 12.
Figure 14:
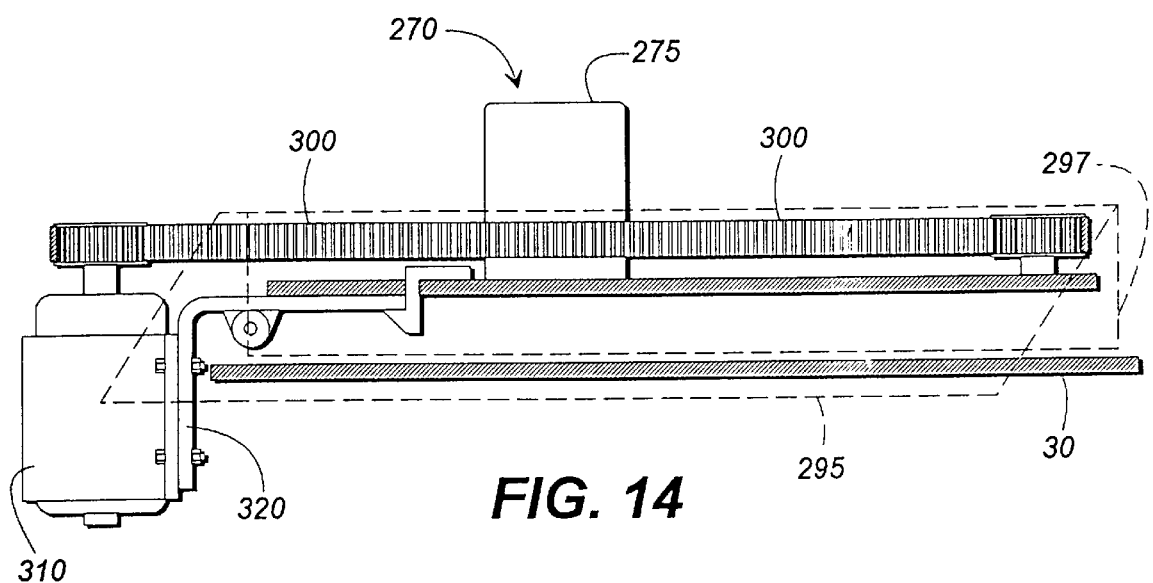
FIG. 14 is a side diagrammatic view of the alternate ejection mechanism of FIG. 12.
Figure 15:
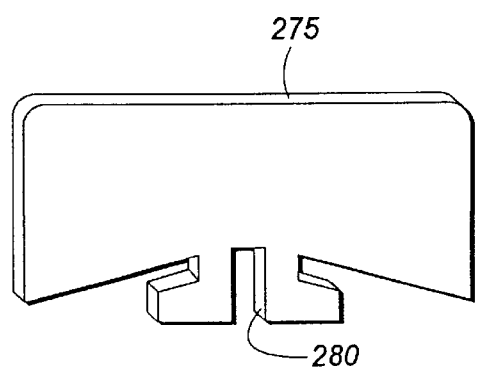
FIG. 15 is a side elevation view of a pusher member of the alternate ejection mechanism of FIGS. 12 and 14.

As shown in FIG. 15, the lower stem of the pusher member 275 includes a toothed cut-out 280 for engagement with a cog belt 300 driven by the motor 310 shown at FIGS. 12 and 14. As shown in FIG. 12 and 13, the ejection mechanism housing 290 includes cover plates 295 and a sub-housing 297. Sub-housing 297 provides a protective enclosure for the cog belt 300 and the lower stem of the pusher member 275 as shown in FIG. 12. The cover plates 295 protect the ejection mechanism 270 and provide a smooth transitional surface between the surface of the platform 30 and the pusher member 275. As shown in FIGS. 13 and 14, the lower surface of the sub-housing 297 is attached to the upper surface of platform 30. It should be readily understood that the parcel ejection mechanism housing 290 may be attached to the platform 30 using a variety of attachment means such as bolts, cement or adhesives. The alternate ejection mechanism 270 is powered by energization of electrical contacts operatively connected to electric motor 310 (not shown) in a manner as described for the preferred embodiment described above.

In addition to the foregoing, a variety of alternate forms of parcel ejection mechanisms may be utilized with the conveyor system 10 involving the present invention. For example, a lead screw driving a push plate or an air bellows member driving a push plate may be used atop the removable platforms.

In operation, the present invention may be utilized to transfer objects such as parcels 12 to a variety of desired output locations. In order to remove an individual platform 30 from the conveyor 10, or to remove a failed parcel ejection mechanism 150 or 270 for maintenance or repair, the platform 30 is lifted at or near the hinge 50 of the platform 30. As shown in FIG. 3, lifting the platform as described, disengages the center locking mechanism 130 and allows for the edges 60 of the panels 40 of the platforms 30 to be disengaged from the co-facing slots 85 formed by the flexible edge retainer members 80.

The number and location of ejection mechanism 150 or 270 and the identification codes for each ejection mechanism may be input into the controller memory when movement of the conveyor systems 10 begins. Parcels 12 are induced sequentially onto the upstream end of the conveyor system 10 manually or automatically by an induction conveying system (not shown). A destination code for each parcel may be entered into the controller memory using a key pad (not shown), a voice recognition device (not shown), or an optical code reader (not shown), before the parcel is placed onto the conveyor system 10 as described above.

Depending on the side of the conveyor system 10 to which the parcel 12 is to be discharged, the PLC will cause a pusher members 170 or 275 of the parcel ejection mechanisms 150 or 270 of the platforms 30 onto which the parcel 12 will be loaded to move to the left or right position by actuating the pusher members 170 or 275 via the electric motors 180 or 310 and the screw actuator 200 or cog belt 300, depending on which form of the ejection mechanism described above is utilized. As the parcel 12 reaches the desired output destination, the spring loaded electrical contacts 250 engage the fixed power bars 260 as shown in FIG. 11. At the direction of the PLC, the electric motor 180 or 310 will be energized via the power bars 260 and electrical contacts 250 to actuate the screw actuator 200 or cog belt 300, as described above. Thus, the pusher members 170 or 275 are slidably actuated across the upper surface of the platforms 30 to discharge the parcel 12 off the upper surface of the platforms 30 and to the desired output destination.

After the parcel 12 is discharged, as described, the PLC will reverse the polarity of the current to the electric motor, as described above, to return the pusher members 170 or 275 to the starting position. Alternatively, the PLC may leave the pusher members 170 or 275 in its current position to discharge a parcel subsequently loaded and directed to the opposite side.

While the present invention in its various aspects has been described in detail with regard to the preferred embodiment thereof, it should be understood that variations, modifications, and enhancements can be made to the disclosed apparatus and procedures without departing from the spirit and scope of the present invention as defined in the appended claims.

I claim:

1. A package conveyor, comprising:

a conveyor base structure;

adjacent first and second platform members each defining an upwardly-directed package support surface and each including leading and trailing edges, and wherein said first platform member is configured to allow its edges to be selectively moved relatively apart or relatively together; and first, second, and third adjacent platform retaining members attached to said conveyor base structure for movement therewith, said first and second platform retaining members configured to accept and detachably retain the edges of said first platform retaining member, and said second and third platform members configured to accept and detachably retain the edges of said second platform member, said second platform retaining member intermediate said first and third platform retaining members and configured to detachably retain the trailing edge of said first platform independent of the detachable retention of the leading edge of said second platform, such that either of the first and second platforms may be disengaged from said second platform retaining member and said conveyor base structure without requiring the disengagement of the other; said leading and trailing edges of said first platform member configured to be retained by said first and second platform retaining members when relatively moved apart and be released by said first and second platform retaining members when moved relatively together.

2. The conveyor of claim 1, wherein said first, second, and third adjacent platform retaining members each have an upper surface being continuous with the upper surfaces of said first and second platforms.

3. The conveyor as claimed in claim 1, wherein said first platform includes a pivotable connection allowing its edges to be movably retractable to allow disengagement from said first and second platform retaining members.

4. The conveyor of claim 3, wherein said first platform further comprises first and second panels, and wherein said pivotable connection is provided by a hinge intermediate said two panels.

5. The conveyor of claim 1, wherein said conveyor base structure is an endless flexible belt and said platform retaining members are attached to the top of said conveyor base structure.

6. The conveyor of claim 1, wherein said platform retaining members are platform edge retainers and run substantially the width of the conveyor base structure.

7. The conveyor of claim 1 wherein at said platform further comprises an ejection mechanism for discharging objects from atop said upwardly-directed package support surface defining by said platform.

8. A conveyor, comprising:

a conveyor base structure;

a platform defining an upwardly-directed package support surface; and platform retaining members attached to conveyor base structure and defining at least two co-facing slots, said platform having opposing edges fitting into said slots such that the conveyor base structure carries said platform, said opposing edges configured to be moved relatively apart or relatively together to allow selective engagement with said slots.

9. The conveyor of claim 8, wherein said platform retaining members have an upper surface being continuous with the upper surface of said platform.

10. The conveyor as claimed in claim 8, wherein said platform includes a pivotable connection allowing its edges to be movably separable and retractable to allow selective engagement with said co-facing slots.

11. The conveyor of claim 10, wherein said platform further comprises first and second panels, and wherein said pivotable connection is provided by a hinge intermediate said two panels.

12. The conveyor of claim 8, wherein said conveyor base structure is an endless flexible belt and said platform retaining members are attached to the top of said conveyor base structure.

13. The conveyor of claim 8, wherein said platform retaining members are platform edge retainers and run substantially the width of the conveyor base structure.

14. The conveyor of claim 8, wherein at said platform further comprises an ejection mechanism for discharging objects from said platform.

15. A conveyor comprising:

a flexible conveyor belt;

platform retaining members attached to the top or bottom side of said conveyor belt;

a platform comprising pivotably connected first and second panels pivotably connected along a pivot axis; and a conveyor belt drive means configured to drive said conveyor belt, platform retaining members, and platform such that said platform can pivot along its pivot axis without becoming detached from said flexible conveyor belt.

16. the conveyor of claim 15, wherein said pivotable connection is provided by a hinge intermediate said two panels.

17. The conveyor as claimed in claim 15, wherein said platform retaining members define cofacing slots for accepting leading and trailing edges of said platform.

18. The conveyor as claimed in claim 17, wherein said platform includes a pivotable connection allowing its edges to be movably separable and retractable to allow selective engagement with said slots.

19. The conveyor of claim 18, wherein said pivotable connection is provided by a hinge intermediate said two panels.

20. The conveyor of claim 17, wherein said platform retaining members are platform edge retainers and run substantially the width of the conveyor base structure.

21. The conveyor of claim 17, wherein said platform retaining members have an upper surface being continuous with the upper surface of said platform.

22. The conveyor of claim 15, further comprising a flexible platform locking means for securing said platform to said conveyor base structure separate from one of said platform edges attaching at least one of said panels relative to said base structure.

23. The conveyor of Claim 22, wherein said platform locking means comprises:

a platform locking pin attached to a lower surface of said platform substantially medially of said platform; and a platform locking pin receptor attached to said conveyor bas e structure for receiving said platform locking pin.

24. A conveyor comprising:

a flexible conveyor belt;

two platform retaining members attached to the top or bottom one side of said conveyor belt;

platform comprising pivotably connected first and second panels pivotably connected along a pivot axis;

a center locking pin intermediate said first and second platform retaining members and attaching said first panel and said conveyor belt; and a conveyor belt drive means configured to drive said conveyor belt, platform retaining members, and platform such that said platform can flex along its pivot axis.

25. The conveyor of claim 24, wherein said pivotable connection is provided by a hinge intermediate said two panels.

26. The conveyor as claimed in claim 24, wherein said platform retaining members define cofacing slots for accepting leading and trailing edges of said at platform.

27. The conveyor as claimed in claim 26, wherein said platform includes a pivotable connection allowing its edges to be movably separable and retractable to allow selective engagement with said slots.

28. The conveyor of claim 27, wherein said pivotable connection is provided by a hinge intermediate said two panels.

29. The conveyor of claim wherein said platform retaining members are platform edge retainers and run substantially the width of the conveyor base structure.

30. The conveyor of claim 26, wherein said platform retaining members have an upper surface being continuous with the upper surface of said platform.

31. The conveyor of claim 24, wherein said center locking pin is part of a platform locking means for securing said platform to said conveyor base structure separate from one of said platform edges attaching at least one of said panels relative to said base structure.

32. The conveyor of claim 31, wherein said platform locking means comprises said platform locking pin attached to a lower surface of said platform substantially medially of said platform, and further comprising a platform locking pin receptor attached to said conveyor base structure for receiving said platform locking pin.

* * * * *

UNITED STATES PATENT AND TRADEMARK OFFICE
CERTIFICATE OF CORRECTION

PATENT NO.    : 5,890,584
DATED         : April 6, 1999
INVENTOR(S)   : Bonnet

It is certified that error appears in the above-identified patent and that said Letters Patent is hereby corrected as shown below:

Column 8,
Line 18, after "platform", please add -- retaining --.

Signed and Sealed this

Ninth Day of July, 2002

Attest:

Attesting Officer

JAMES E. ROGAN
Director of the United States Patent and Trademark Office